(12) United States Patent
Wei et al.

(10) Patent No.: US 9,544,328 B1
(45) Date of Patent: Jan. 10, 2017

(54) METHODS AND APPARATUS FOR PROVIDING MITIGATIONS TO PARTICULAR COMPUTERS

(71) Applicant: Trend Micro Incorporated, Tokyo (JP)

(72) Inventors: Peter Shaohong Wei, Sunnyvale, CA (US); Viswa Soubramanien, Cupertino, CA (US); Wei Yan, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 15/079,439

(22) Filed: Mar. 24, 2016

Related U.S. Application Data

(62) Division of application No. 12/751,889, filed on Mar. 31, 2010, now abandoned.

(51) Int. Cl.
*H04L 29/06* (2006.01)

(52) U.S. Cl.
CPC ................. *H04L 63/1441* (2013.01)

(58) Field of Classification Search
None
See application file for complete search history.

(56) References Cited

U.S. PATENT DOCUMENTS

| | | | | |
|---|---|---|---|---|
| 5,442,699 A * | 8/1995 | Arnold | ........ | G11B 23/284 380/1 |
| 5,452,442 A * | 9/1995 | Kephart | ........ | G06F 21/564 713/188 |
| 5,907,834 A * | 5/1999 | Kephart | ........ | G06F 21/564 706/14 |
| 6,192,512 B1 * | 2/2001 | Chess | ........ | G06F 9/455 714/38.12 |
| 6,279,128 B1 * | 8/2001 | Arnold | ........ | G06F 21/567 714/49 |
| 6,560,632 B1 * | 5/2003 | Chess | ........ | H04L 29/06 709/201 |
| 6,622,134 B1 * | 9/2003 | Sorkin | ........ | G06F 21/56 706/12 |
| 6,711,583 B2 * | 3/2004 | Chess | ........ | G06F 21/565 707/690 |
| 6,757,830 B1 * | 6/2004 | Tarbotton | ........ | G06Q 10/107 709/226 |
| 6,785,732 B1 * | 8/2004 | Bates | ........ | G06F 21/56 709/232 |
| 6,789,200 B1 * | 9/2004 | Fiveash | ........ | G06F 21/566 719/331 |
| 6,813,712 B1 * | 11/2004 | Luke | ........ | G06F 21/566 714/28 |
| 7,000,247 B2 * | 2/2006 | Banzhof | ........ | G06F 21/577 726/2 |
| 7,152,164 B1 * | 12/2006 | Loukas | ........ | G06F 21/56 709/202 |

(Continued)

*Primary Examiner* — Michael R Vaughan
(74) *Attorney, Agent, or Firm* — Okamoto & Benedicto LLP

(57) ABSTRACT

Mitigation for combating malicious codes is delivered to particular endpoint computers. A first malicious code pattern is received in a first computer over a computer network. The first computer is scanned using the first malicious code pattern, with the result of the scanning forwarded to a second computer. The first computer is identified as having a file scanned using the first malicious code pattern. In response, the first computer is provided a second malicious code pattern. The first computer is scanned for malicious codes using the second malicious code pattern.

10 Claims, 9 Drawing Sheets

(56) References Cited

U.S. PATENT DOCUMENTS

| | | | | |
|---|---|---|---|---|
| 7,299,035 B2* | 11/2007 | Morota | G06F 21/564 | 455/414.1 |
| 7,386,297 B2* | 6/2008 | An | H04W 12/12 | 455/410 |
| 7,464,326 B2* | 12/2008 | Kawai | G06F 17/3089 | 707/E17.116 |
| 7,472,422 B1* | 12/2008 | Agbabian | H04L 41/06 | 726/25 |
| 7,690,038 B1* | 3/2010 | Ko | H04L 63/1425 | 726/24 |
| 7,992,207 B2* | 8/2011 | Korkishko | G06F 21/566 | 709/224 |
| 8,078,145 B2* | 12/2011 | An | H04W 12/12 | 455/410 |
| 8,127,358 B1* | 2/2012 | Lee | G06F 21/564 | 726/22 |
| 8,250,657 B1* | 8/2012 | Nachenberg | G06F 21/51 | 705/50 |
| 8,972,379 B1* | 3/2015 | Grieselhuber | G06F 17/30864 | 707/713 |
| 8,978,139 B1* | 3/2015 | Banerjee | H04L 63/1416 | 726/24 |
| 2002/0010683 A1* | 1/2002 | Aune | G06Q 20/3674 | 705/67 |
| 2004/0255167 A1* | 12/2004 | Knight | G06Q 10/10 | 726/24 |
| 2005/0251862 A1* | 11/2005 | Talvitie | G06F 21/567 | 726/24 |
| 2006/0004636 A1* | 1/2006 | Kester | G06F 21/50 | 705/22 |
| 2006/0037079 A1* | 2/2006 | Midgley | G06F 21/56 | 726/24 |
| 2007/0220608 A1* | 9/2007 | Lahti | G06F 21/564 | 726/24 |
| 2008/0127336 A1* | 5/2008 | Sun | G06F 21/566 | 726/22 |
| 2008/0244748 A1* | 10/2008 | Neystadt | H04L 63/1425 | 726/25 |
| 2009/0077665 A1* | 3/2009 | Chang | G06F 21/566 | 726/24 |
| 2009/0089879 A1* | 4/2009 | Wang | G06F 21/53 | 726/24 |
| 2010/0031361 A1* | 2/2010 | Shukla | G06F 21/568 | 726/24 |
| 2011/0004850 A1* | 1/2011 | Lodico | G06Q 30/02 | 715/838 |
| 2011/0302656 A1* | 12/2011 | El-Moussa | H04L 63/1425 | 726/24 |

\* cited by examiner

METHODS AND APPARATUS FOR PROVIDING MITIGATIONS TO PARTICULAR COMPUTERS

CROSS-REFERENCE TO RELATED APPLICATION

This application is a divisional of U.S. application Ser. No. 12/751,889, filed on Mar. 31, 2010, which is incorporated herein by reference in its entirety.

BACKGROUND OF THE INVENTION

1. Field of the Invention

The present invention relates generally to computer security, and more particularly but not exclusively to methods and apparatus for combating malicious codes in computer systems.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to as "viruses." Malicious codes have become so prevalent that experienced computer users have some form of antivirus in their computers.

Antivirus for scanning data for malicious codes is commercially available from several vendors, including Trend Micro, Inc. An antivirus may be configured to perform a response action upon detection of malicious code or possibility of malicious code. For example, upon detection of a file infected with malicious code, the response action may involve deletion, quarantine, or clean up of the infected file. Typically, the response actions are performed independent of one another and are executed for each run of the antivirus.

SUMMARY

In one embodiment, a first malicious code pattern is received in a first computer over a computer network. The first computer is scanned using the first malicious code pattern, with the result of the scanning forwarded to a second computer. The first computer is identified as having a file scanned using the first malicious code pattern. In response, the first computer is provided a second malicious code pattern. The first computer is scanned for malicious codes using the second malicious code pattern.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored non-transitory in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. As can be appreciated, software components may be executed by a processor to perform computational and other data processing steps, which may include consulting a database to search for and find particular information, storing and retrieving information from a database, sending or receiving data from other computers, relaying data from one computer to another, and so on. Software components may be implemented in logic circuits, for example. Components may be implemented separately in multiple modules or together in a single module.

Figure 1:
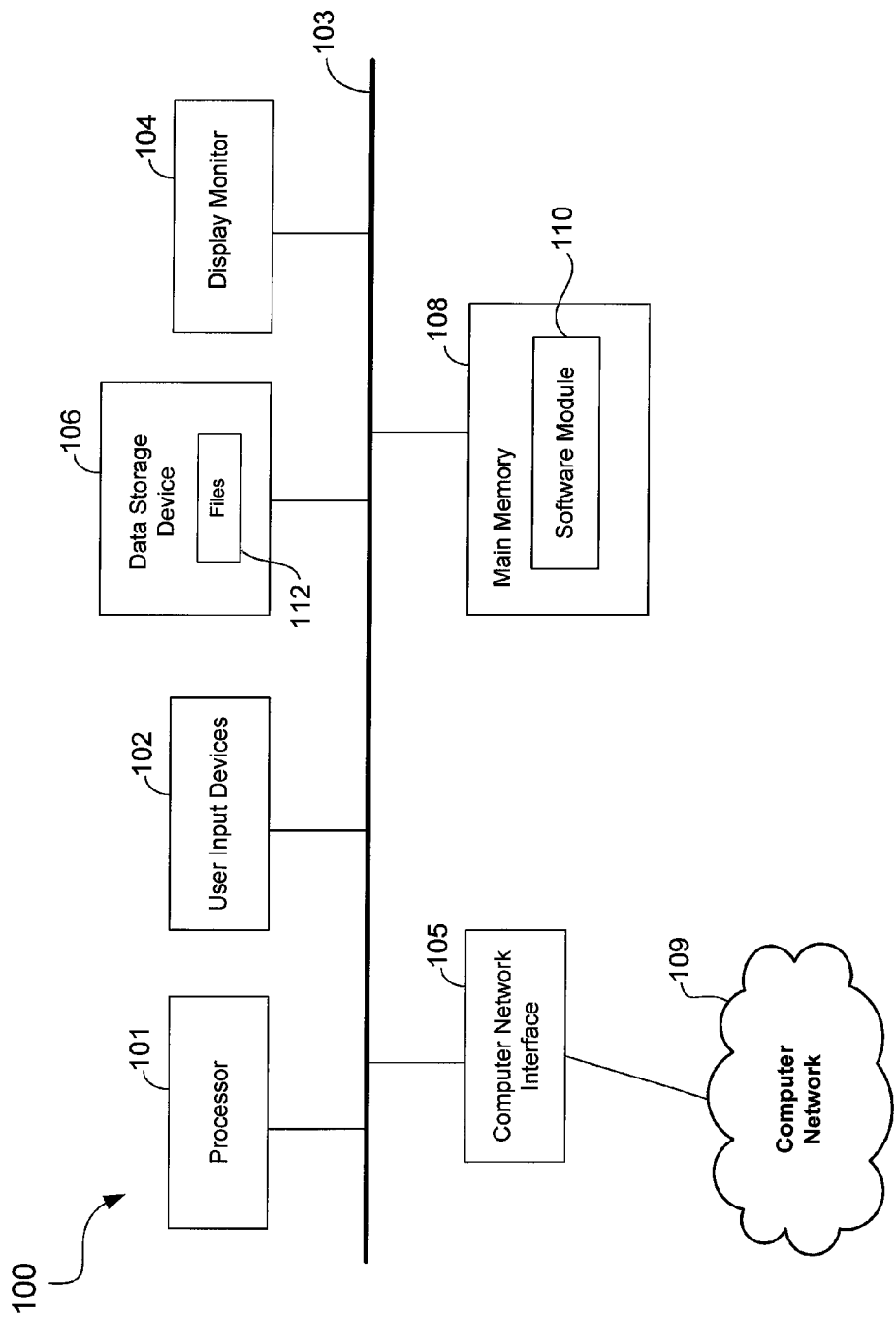
FIG. 1 schematically shows a schematic diagram of a computer in accordance with an embodiment of the present invention.

FIG. 1 schematically shows a schematic diagram of a computer 100 in accordance with an embodiment of the present invention. The computer 100 may be employed as an endpoint computer, support computer, security gateway computer, or security management server computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may be loaded from the data storage device 106 to the main memory 108 for execution by the processor 101. Likewise, the data storage device 106 may store files 112 that may be loaded into the main memory 108.

Figure 2:
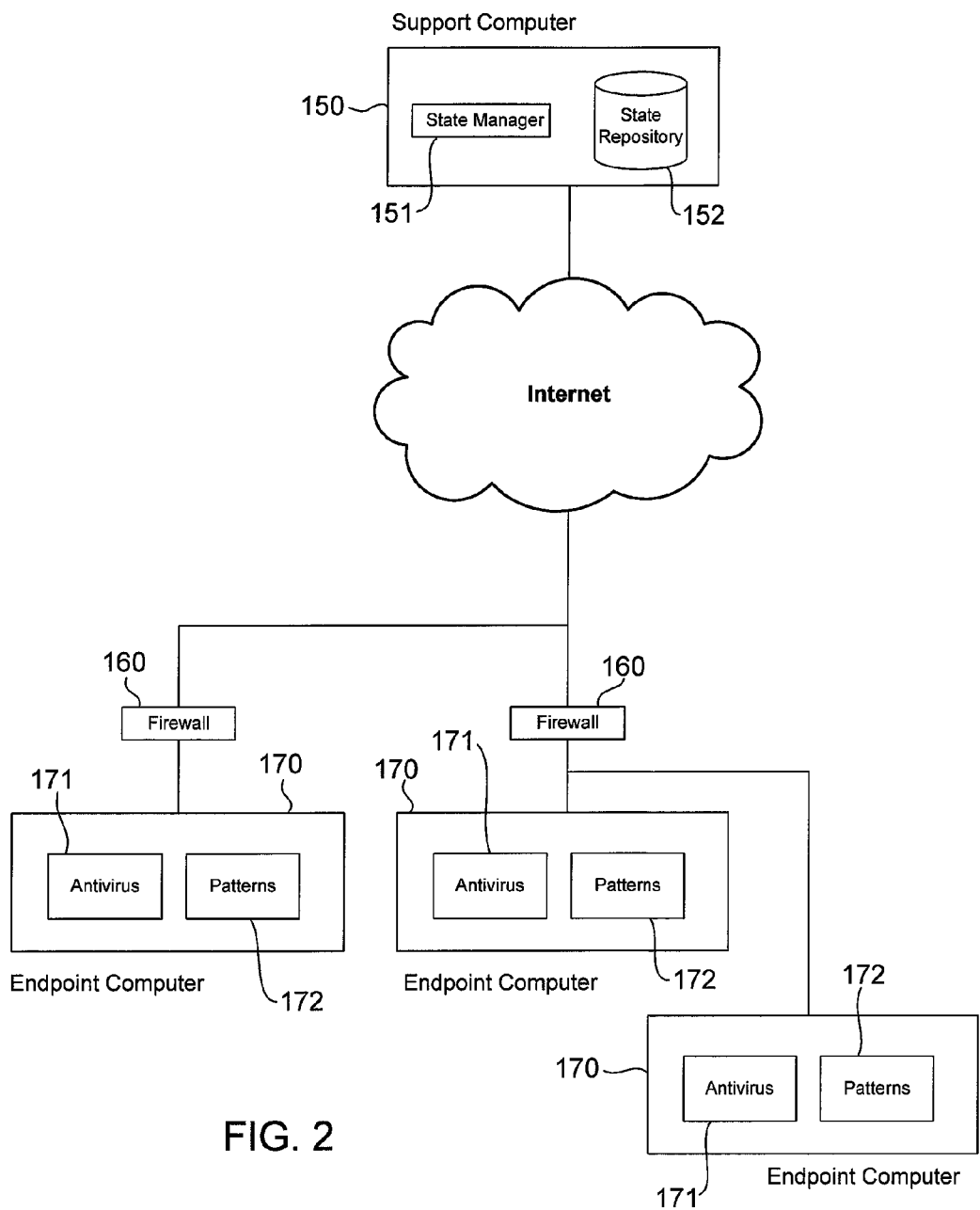
FIG. 2 schematically shows a computing environment in accordance with an embodiment of the present invention.

FIG. 2 schematically shows a computing environment in accordance with an embodiment of the present invention. In the example of FIG. 2, the computing environment includes a plurality of endpoint computers 170 and one or more support computers 150. Only one support computer 150 is shown in FIG. 2 for clarity of illustration. The computers of FIG. 2 may communicate over the Internet.

In one embodiment, the support computer 150 comprises a server computer maintained and operated by a computer security vendor (e.g., Trend Micro, Inc.) providing an antivirus 171 to the endpoint computers 170. The antivirus 171 may comprise computer-readable program code configured to scan files or other data units for malicious codes. In the example of FIG. 2, an antivirus 171 uses patterns 172 to scan for malicious codes using a pattern matching algorithm. For example, an antivirus 171 may scan a file (e.g., file 112 shown in FIG. 1) for malicious codes by matching the contents of the file against patterns or signatures of computer viruses included in the patterns 112. Besides patterns of malicious codes, the patterns 172 may also include instructions for performing response actions, detecting malicious codes by heuristics, and other information for combating malicious codes. The patterns 172 may be periodically updated to contain the latest information for combating malicious codes.

In the example of FIG. 2, an endpoint computer 170 includes an antivirus 171 and patterns 172. An endpoint computer 170 may comprise a client computer, a server computer, a gateway computer, or other computer where detection for malicious code is performed. The endpoint computers 170 may comprise client computers behind a firewall 160. In one embodiment, each endpoint computer 170 is assigned a Globally Unique Identifier (GUID) for uniquely identifying the particular endpoint computer. In one embodiment, the GUID comprises an identifier that comprises the Internet protocol (IP) address of the endpoint computer 170 and some other identifier. For example, the GUID may comprise a combination (e.g., concatenation) of the IP address and MAC (media access control) address of an endpoint computer 170. As another example, the GUID may comprise a combination of the IP address of the endpoint computer 170 and the IP address of the gateway computer supporting the endpoint computer 170. Note that an IP address alone may not be sufficient as a GUID because an endpoint computer may be using the IP address of a firewall 160 or another network node. In that case, multiple endpoint computers 170 behind the same firewall 160 may end up having the same IP address, preventing identification of a particular endpoint computer 170.

Figure 3:
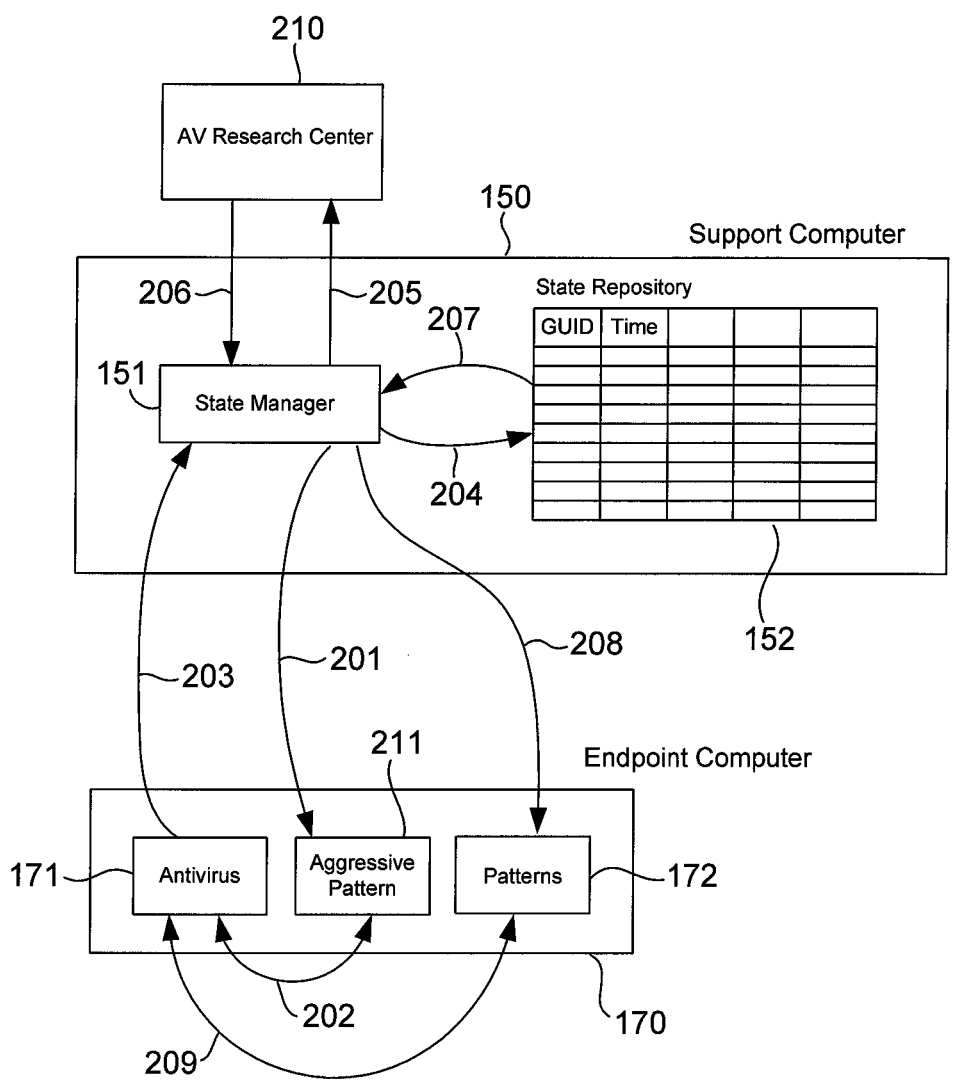
FIG. 3 shows a flow diagram illustrating operation of a support server computer and an endpoint computer in accordance with an embodiment of the present invention.

Referring now to FIG. 3, there is shown a flow diagram illustrating operation of the support server computer 150 and an endpoint computer 170 in accordance with an embodiment of the present invention. The flow diagram of FIG. 3 schematically illustrates use of stateful management of malicious codes in conjunction with data collection on a per endpoint basis.

In the example of FIG. 3, the support server computer 150 includes a state manager 151 and a state repository 152. In one embodiment, the state manager 151 comprises computer-readable program code configured to communicate with an endpoint computer 170. In one embodiment, the state manager 151 facilitates providing updates to the antivirus 171, which may include updates to the patterns 172 or other component of the antivirus 171. The state manager 151 may be configured to receive endpoint information from an endpoint computer 170 and record the endpoint information in the state repository 152. The state manager 151 may be configured to consult the state repository 152 to identify and deliver a targeted solution to a particular endpoint computer 170.

The endpoint information may comprise information regarding computer security events in the corresponding endpoint computer 170, including the GUID of the endpoint computer 170, when the antivirus 171 was executed to scan for malicious code on the endpoint computer 170, the identifier and version of the patterns 172 employed by the antivirus 171 to perform the scanning, any malicious code that was detected, any response action performed, the filename of each file that was scanned, file source, and so on. A file source may indicate the source of the file, such as the computer-readable medium from which the file was loaded (e.g., CD) and whether the file was obtained over Internet or from a local intranet or file server. The endpoint information may additionally include product information (e.g., particular model, suite, or package of the antivirus) and customer profile (e.g., geographic location, customer category, privacy disclaimer grant level). As will be more apparent below, the state repository 152 may store different or additional information depending on the application. For example, the state repository 152 may store URL (uniform resource locator) and category information for applications involving reputation services. The state repository 152 may comprise a database, for example.

In the example of FIG. 3, the state manager 151 may initiate data collection by delivering an aggressive pattern 211 to the endpoint computer 170 (arrow 201). In one embodiment, the aggressive pattern 211 comprises patterns that are very inclusive, i.e., err on the side of detection, to allow for as much malicious code detection as possible. This makes the aggressive pattern 211 susceptible to generating false positives, i.e., erroneously reporting detection of malicious code. However, the relatively large number of false positives is offset by the resulting large amount of collected samples of files that may be infected with malicious code. The antivirus 171 may be configured to detect arrival of the aggressive pattern 211 in the endpoint computer 170 and initiate scanning of files (e.g., files 112 shown in FIG. 1) in the endpoint computer 170 using the aggressive pattern 211 (arrow 202). The antivirus 171 reports the result of the scanning to the state manager 151 as endpoint information (arrow 203). In this example, the endpoint information indicates the GUID of the endpoint computer 170, the time stamp of when the scanning was performed, the identifier and version of the aggressive pattern 211, the files scanned using the aggressive pattern 211, and the result of the scanning of each of the files. The antivirus 171 may also forward samples (i.e., copy) of the scanned files to the state manage 151. The antivirus 171 does not perform any response action or issue any alert in the endpoint computer 170 when a file is detected to have contents matching the aggressive pattern 211. This is because the detection may be a false positive due to the inclusive nature of the aggressive pattern 211.

The state manager 151 receives the endpoint information from the antivirus 171, records the endpoint information in the state repository 152 (arrow 204), and reports the endpoint information to a server computer of an antivirus research center 210 (arrow 205). The state manager 151 also receives samples of the scanned files from the antivirus 171 and forwards the samples of the scanned files to the antivirus research center 210. The antivirus research center 210 may be operated by the vendor of the antivirus 171. In the example of FIG. 3, the support computer 150 is shown as separate from the antivirus research center 210, and may communicate with each other over the Internet. In some embodiments, the support computer 150 is part of the antivirus research center 210.

The antivirus research center 210 may have antivirus researchers that study and analyze the samples of the scanned files. Using the samples of the scanned files, the antivirus researchers are able to develop a mitigation, also known as an antidote, that may be used to detect and remove a newly discovered malicious code. The mitigation may comprise a pattern for detecting the newly discovered malicious code and instructions on what to do upon detection of the malicious code. The mitigation may be included in an update for the patterns 172. The antivirus research center 210 forwards the update to the state manager 151 (arrow 206). The antivirus research center also forwards to the state manager 151 a listing of scanned file samples infected with the newly discovered malicious code. The state manager 151 consults the state repository 152 (arrow 207) to identify particular endpoint computers 170 that have scanned files infected with the newly discovered malicious code. The state manager 151 provides the update to the endpoint computers 170 identified as having files with the newly discovered malicious code (arrow 208). The state manager 151 indicates in the state repository 152 the endpoint computers 170 receiving the update. The update may be tracked by its version number, file name, and/or file number.

The endpoint computers 170 identified by the state manager 151 as having infected files may have priority in receiving the update. Thereafter, the state manager 151 provides the update to other endpoint computers 170. In other embodiments, especially those involving targeted attacks, the update is provided only to endpoint computers 170 identified as having the infected files.

Using the update received from the state manager 151, the antivirus 171 updates the patterns 172 to include the mitigation. The antivirus 171 uses the updated patterns 172 to scan the infected files as high priority (arrow 209). The antivirus 171 may thereafter scan other files in the endpoint computer 170 for malicious codes. The antivirus 171 provides endpoint information to the state manager 151 reporting the result of the scanning using the updated patterns 172. The state manager 151 stores the endpoint information in the state repository 152.

As can be appreciated from the foregoing, embodiments of the present invention provide advantages heretofore unrealized. First, the scanning process is not performed on an individual basis, but may be used for data collection or as a part of a multi-phase scanning process. In the example of FIG. 3, the scanning using the aggressive pattern 211 allows identification of files that need a follow on scanning using updated patterns 172.

Second, malicious code is managed on a stateful basis by keeping track of scanning events. In the example of FIG. 3, the result of the scanning using the aggressive pattern 211 is stored in the state repository 152. This allows the state manager 151 to manage malicious code by knowing which endpoint computer 170 has been infected with the malicious code, when the endpoint computer was infected, the files infected, response actions performed on the files if any, and other endpoint information. As a result, the state repository 152 has information on the malicious code in its discovery state (data collection) and subsequent mitigation states (delivery of updates). As can be appreciated, the patterns 172 may be updated several times before a newly discovered malicious code is controlled. The state repository 152 allows for keeping track of the history of combating a particular malicious code through its life cycle.

Third, embodiments of the present invention allow for generation of mitigation that is tailored for a particular endpoint computer 170. In the example of FIG. 3, the state manager 151 is able to provide mitigation for particular endpoint computers 170 having files infected by new malicious code. This approach could be extended to include mitigation that addresses targeted attacks, i.e., attacks that only affect a particular endpoint computer 170. The mitigation for the targeted attack may be delivered only to the targeted endpoint computer 170, instead of delivering the mitigation to all endpoint computers 170 in general. This not only saves communication bandwidth, but also allows for mitigation that has fewer restrictions in terms of following privacy laws and other regulations or restrictions.

Figure 4:
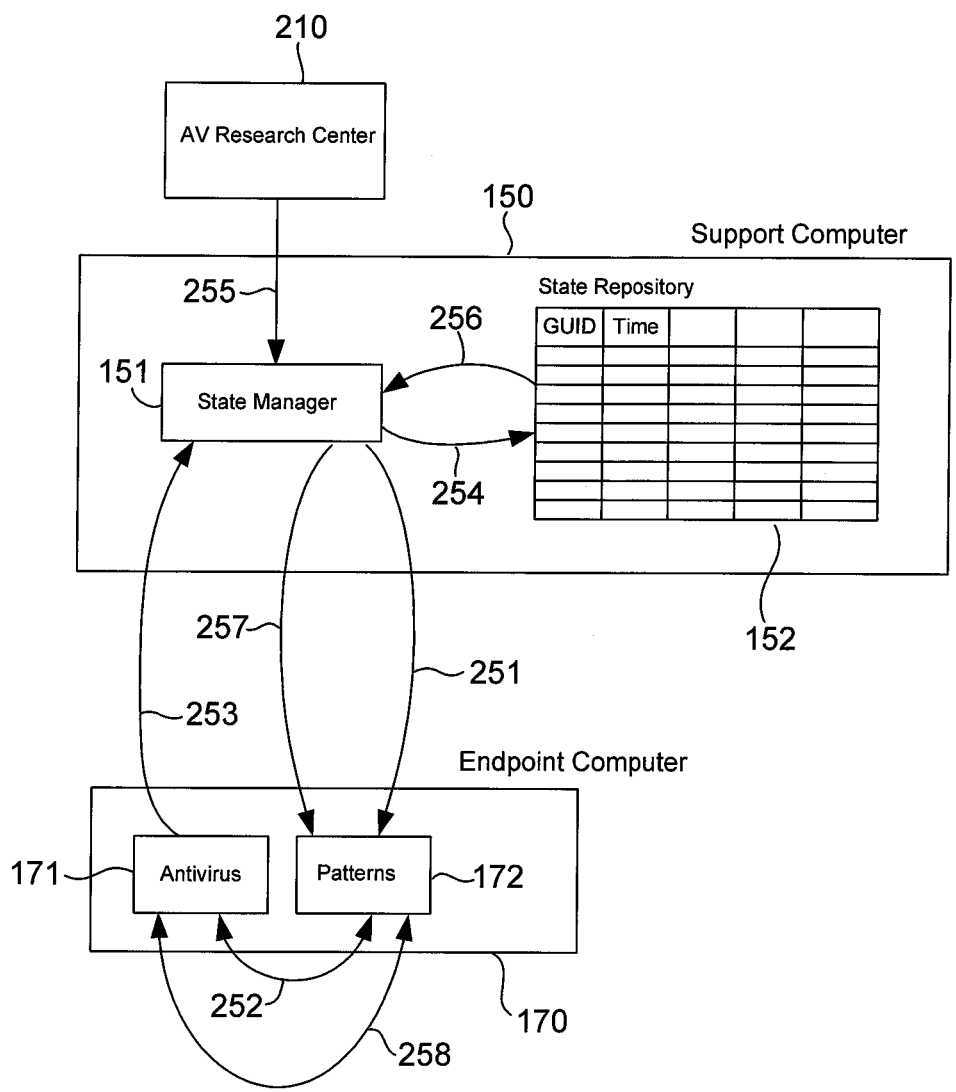
FIG. 4 shows a flow diagram illustrating operation of a support server computer and an endpoint computer in accordance with another embodiment of the present invention.

FIG. 4 shows a flow diagram illustrating operation of the support server computer 150 and an endpoint computer 170 in accordance with another embodiment of the present invention. In the embodiment of FIG. 4, mitigation is delivered to particular endpoint computers 170 without having to do an initial data collection using an aggressive pattern.

In the example of FIG. 4, the state manager 151 provides an update to the patterns 172 (arrow 251). The antivirus 171 updates the patterns 172 using the update, and then uses the patterns 172 to scan files in the endpoint computer 170 for malicious codes (arrow 252). The antivirus 171 provides endpoint information comprising the results of the scanning to the state manager 151 (arrow 253). The endpoint information may comprise the GUID of the endpoint computer 170, when the antivirus 171 was executed to scan for malicious code on the endpoint computer 170, the identifier and version of the patterns 172 employed by the antivirus 171 to perform the scanning, any malicious code that was detected, any response action performed, the filenames of files that were scanned, the file source, and so on. The state manager 151 receives the endpoint information from the antivirus 171 and records the endpoint information in the state repository 152 (arrow 254).

At a later point in time, the state manager 151 receives updated patterns from the antivirus research center 210 (arrow 255). The updated patterns may be due to a variety of reasons, including rollback of a response action that was performed due to a false positive, a pattern with clean up response action is released to do damage clean up for a malicious code pattern, a malicious code pattern with write action (e.g., actions that involve file deletion, quarantine, or cleanup) is released, a family pattern is released to cover a single pattern, a script pattern is released to replace a previous pattern, and so on. The state manager 151 consults the state repository 152 to identify particular endpoint computers that have patterns 172 that need the update (arrow 256). The state manager 151 provides the update to the endpoint computer 170 (arrow 257), where the antivirus 171 uses the update to update the patterns 172. The antivirus 171 uses the updated patterns 172 to scan files on the endpoint computer 170 (arrow 258).

Figure 5:
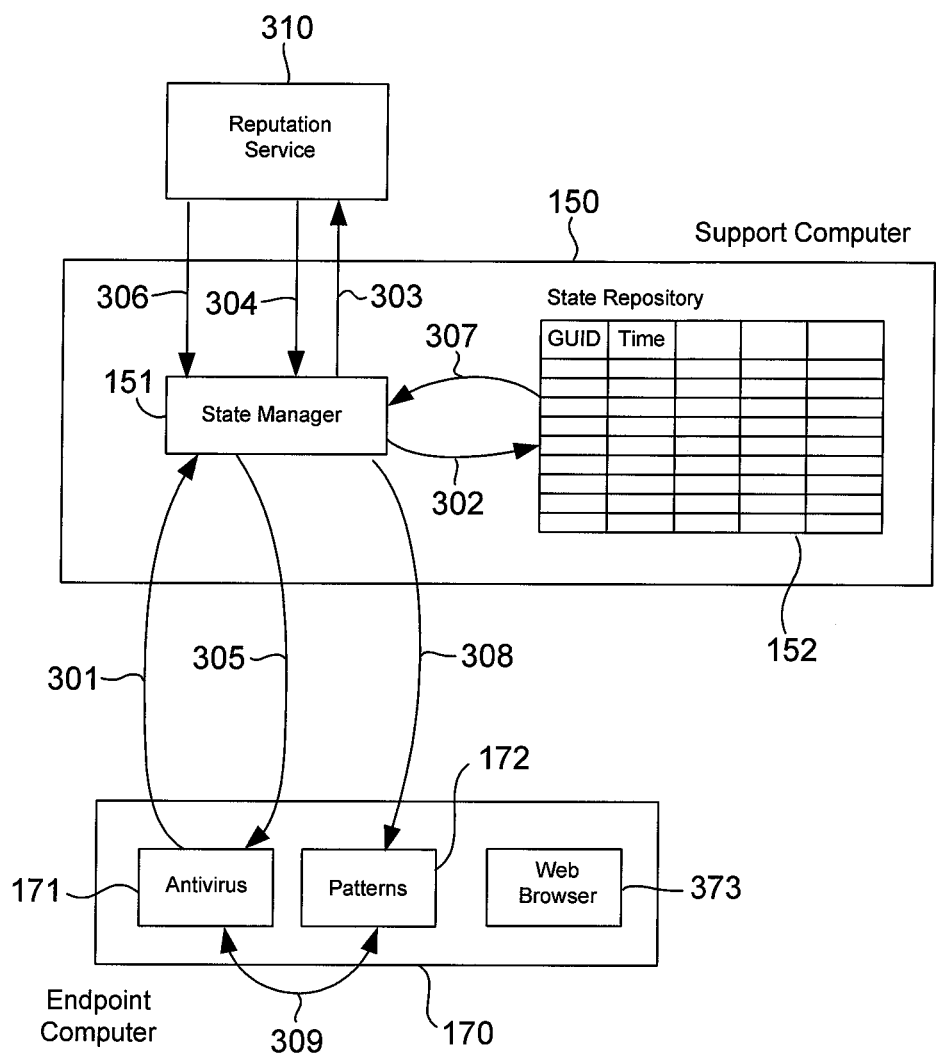
FIG. 5 shows a flow diagram illustrating operation of a support server computer and an endpoint computer involving reputation service in accordance with an embodiment of the present invention.

Embodiments of the present invention may be employed in a variety of computer security applications. FIG. 5 shows a flow diagram illustrating operation of the support server computer 150 and an endpoint computer 170 in an embodiment involving reputation service.

In the example of FIG. 5, the state manager 151 receives reputation information from a server computer of a reputation service 310. Generally speaking, a reputation service provides a reputation of a file, network address, web page, and other identifiable object. The reputation may indicate whether the object is malicious, infected, of a particular type, of a particular category, etc. For example, the reputation service 210 may maintain a database of reputations of uniform resource locators (URL's). The reputation of a corresponding URL may indicate if the URL poses a security threat (e.g., performs drive-by download of malicious code to visiting computers, hosts infected files, hijacked) or of a particular category (e.g., a URL of a pornographic website, a phishing website). The database of reputations may be populated a variety of ways including by actively looking for malicious websites, data collection using honey pots, collaboration between vendors, user inputs, and so on.

In the example of FIG. 5, the antivirus 171 is further configured to perform URL reputation queries and perform URL filtering. In one embodiment, the antivirus 171 is configured to monitor URL's where the web browser 373 is navigating to, determine the reputation of the URL's, and perform a response action if the web browser is navigating to a URL that poses a security threat or belongs to a prohibited category of website. For example, the antivirus 171 may be configured to block websites that pose a security threat or belongs to prohibited category of website, such as a pornography website.

In operation, the antivirus 171 detects a URL of a website where the web browser is navigating to. The antivirus 171 sends a reputation query to the state manager 151 (arrow 301). The reputation query may include the GUID of the endpoint computer 170, the URL, and a timestamp indicating when the web browser 373 is navigating to the URL. The state manager 151 receives the reputation query and stores the GUID of the endpoint computer 170, the URL, and the timestamp in the state repository 152 (arrow 302). The state manager forwards the reputation query to the reputation service 310 (arrow 303). The reputation service 310 consults its reputation database and provides the reputation of the URL to the state manager 151 (arrow 304). The state manager 151 updates the record of the endpoint computer 170 in the state repository 152 with the reputation of the URL (arrow 302). For example, the state manager 151 may update the record of the endpoint computer 170 to indicate the category of the URL and whether or not the URL belongs to a malicious website. In this example, the reputation service 310 indicates that the URL has no corresponding reputation in the reputation database at this time. The state manager 151 forwards the result of the reputation query to the endpoint computer 170 (arrow 305).

Sometime after the state manager forwarded the result of the reputation query to the endpoint computer 170, the state manager 151 receives a reputation change notice from the reputation service 310 (arrow 306). The reputation change notice indicates that the URL is later found to belong to a malicious website that delivers infected files to visiting computers. The reputation change notice may also include a mitigation that can be used to disinfect computers that navigated to the URL. That is, the mitigation addresses a malicious action that may have occurred on the endpoint computer 170 due to the navigation of the endpoint computer 170 to the website. The state manager 151 consults the state repository 152 to identify particular endpoint computers that navigated to the URL (arrow 307). The state manager 151 provides the mitigation to the identified endpoint computers 170 (arrow 308). In this example, the mitigation comprises a malicious code pattern for updating the patterns 172. The antivirus 171 uses the updated patterns 172 to scan for malicious codes that have originated from the URL (arrow 309).

As can be appreciated from the foregoing, the embodiment of FIG. 5 may also be applied to file reputations. For example, the reputation service 310 may maintain a database of reputation of files downloadable over the Internet. Before the web browser 373 is allowed to download a file to the endpoint computer 170, the antivirus 171 may be configured to send a reputation query for the downloadable file. When the reputation of a file downloaded to the endpoint computer 170 changes for the worse, e.g., changes from unknown to malicious, the state repository 152 may be consulted to identify and provide mitigation to particular endpoint computers 170 that have downloaded the file.

Figure 6:
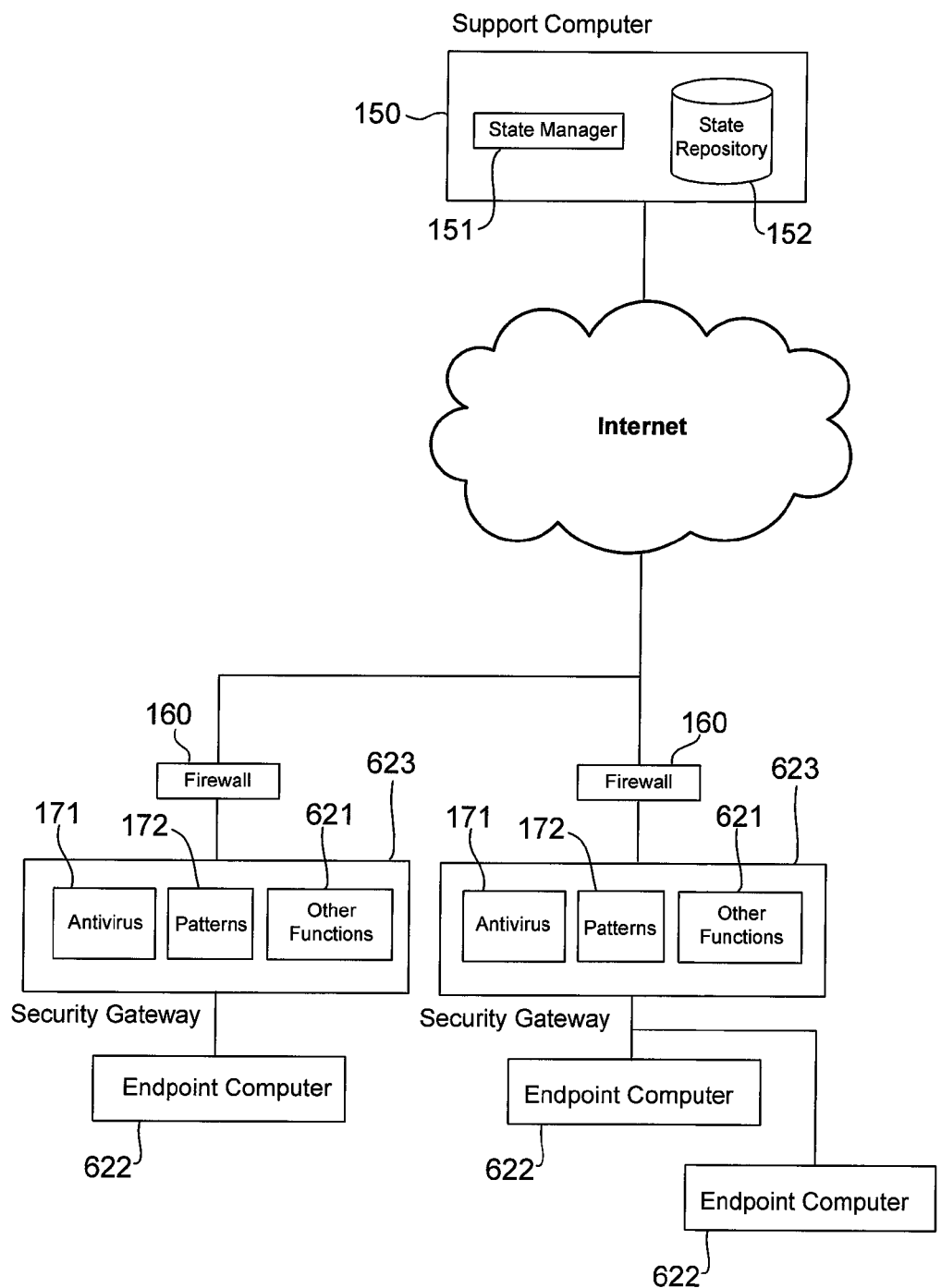
FIG. 6 schematically shows a computing environment in accordance with another embodiment of the present invention.

Embodiments of the present invention may be implemented in different computing environments. Shown in FIG. 6 is a computing environment in accordance with another embodiment of the present invention. In the example of FIG. 6, the computing environment includes a plurality of endpoint computers 622, one or more support computers 150, firewalls 160, and a plurality of security gateways 623. The computers of FIG. 6 may communicate over a computer network.

The computing environment of FIG. 6 is the same as in FIG. 2 except for the addition of a security gateway 623 for each firewall node. An endpoint computer 622 is the same as an endpoint computer 170 except that an endpoint computer 622 does not need to have an antivirus 171. This is because antivirus functionality may be centrally provided by a security gateway 623 acting as a gateway for the endpoint computer 622.

A security gateway 623 may comprise a server computer or appliance providing centralized gateway functionality, such as Internet connectivity, for a group of endpoint computers 622. The security gateway 623 may include an antivirus 171 and patterns 172 to provide antivirus functionality by scanning for malicious code network traffic going through the security gateway 623. The antivirus 171 and patterns 172 operate in the security gateway 623 in a similar manner as previously discussed. The security gateway 623 may also have other functions 621, which may include firewall functionality. In that embodiment, the firewall 160 is part of the security gateway 623.

In the example of FIG. 6, an endpoint computer 622 may have a GUID that includes the IP address of a corresponding security gateway 623. For example, the endpoint computer 622 may have a GUID that includes the IP address of the endpoint computer 622 and the IP address of the security gateway 623. Computer security events in the endpoint computer 622 (e.g., virus detection, reputation information provided to the endpoint computer 622, websites navigated to by the endpoint computer 622, files received in the endpoint computer 622) may be forwarded from the endpoint computer 622 to the support computer 150 by way of the security gateway 623. The state manger 151 may record the security event in the state repository 152 under the GUID of the endpoint computer 622 as previously discussed. Any mitigation identified by the state manager 151 as being needed by the endpoint computer 622 may be provided directly from the support computer 150 to the endpoint computer 622. For example, the endpoint computer 622 may poll the support computer 150 for the mitigation. The mitigation may be provided by the support computer 150 to the endpoint computer 622 using the polling connection. The mitigation may also be provided by the support computer 150 to the security gateway 623, which then provides the mitigation to the endpoint computer 622.

Figure 7:
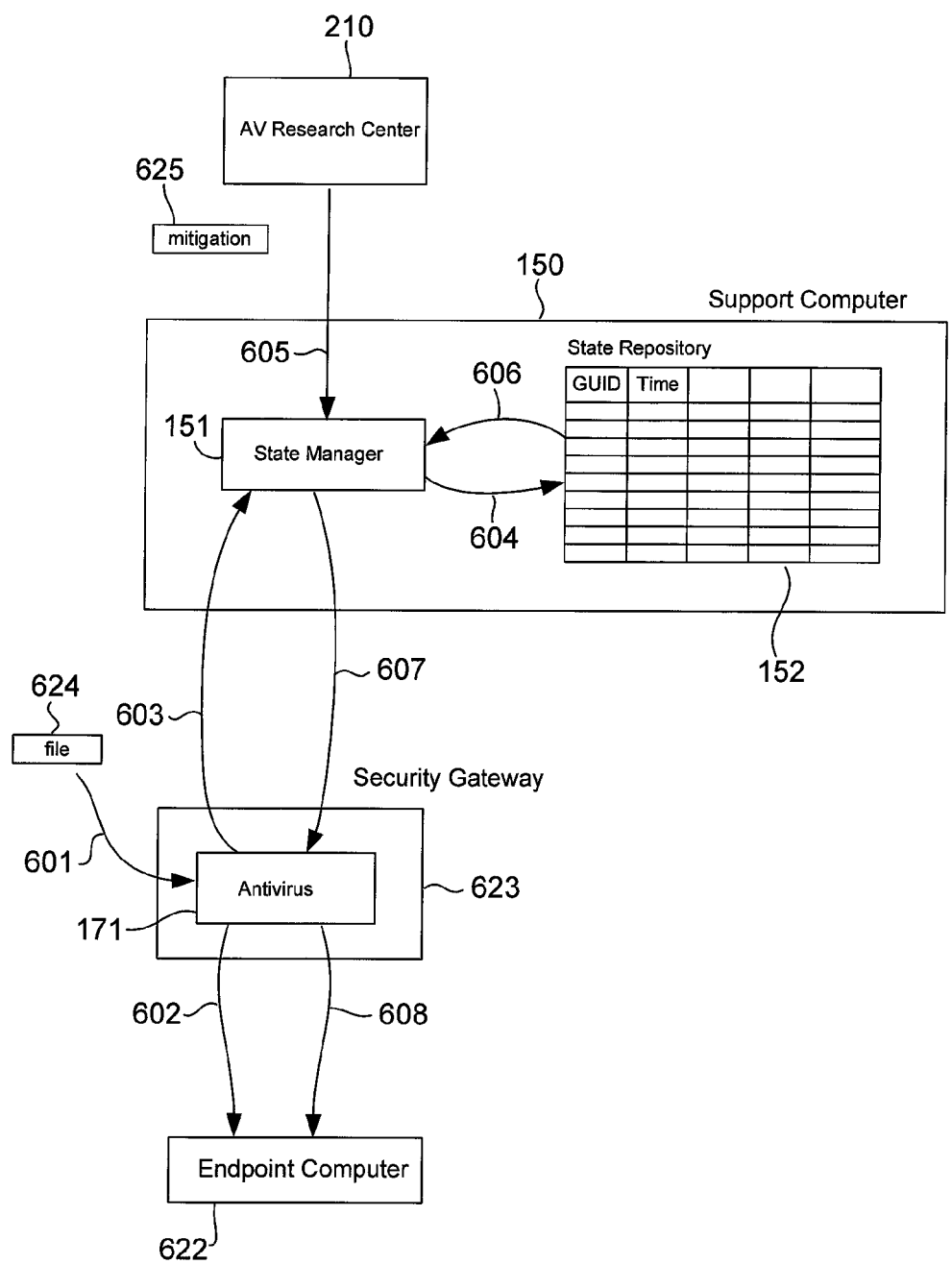
FIG. 7 shows a flow diagram schematically illustrating the operation of a support server computer, an endpoint computer, and a security gateway in accordance with an embodiment of the present invention.

FIG. 7 shows a flow diagram schematically illustrating the operation of a support server computer, an endpoint computer, and a security gateway in accordance with an embodiment of the present invention.

In the example of FIG. 7, the security gateway computer 623 receives a file (labeled as 624) destined for the endpoint computer 622 (arrow 601). The antivirus 171 scans the file for malicious codes and, deeming the file to be clean at that time, provides the file to the endpoint computer 622 (arrow 602). The security gateway computer 623 may receive the file over the Internet, and communicate with the endpoint computer 622 over a private computer network, such as a local intranet. The security gateway computer 623 provides endpoint information to the state manager 151 (arrow 603), indicating that the endpoint computer 623 has received the file at a particular time. The state manager 151 stores the endpoint information in the state repository 152 under the GUID of the endpoint computer 622 (arrow 604). The entry for the endpoint computer 622 in the repository 152 may include the network address of the security gateway 623. At a later point in time, the state manager 151 receives a notification from the AV research center 210 that the file received by the endpoint computer 622 is actually infected with malicious code previously undetectable by the antivirus 171. The AV research center 210 also provides mitigation (labeled as 625) that includes a new malicious code pattern and a local antivirus that may be run to disinfect a computer infected by the file. The state manager 151 receives the mitigation (arrow 605) and searches the state repository 152 for computers that may have received the file. The state manager 151 finds that the endpoint computer 622 has received the file (arrow 606) and accordingly provides the mitigation to the security gateway 623 (arrow 607), which then forwards the mitigation to the endpoint computer 622 (arrow 608). The endpoint computer 622 uses the mitigation to disinfect the endpoint computer 622 of the malicious code. For example, the mitigation may include an antivirus and a pattern file that will detect and remove the malicious code in the endpoint computer 622.

Figure 8:
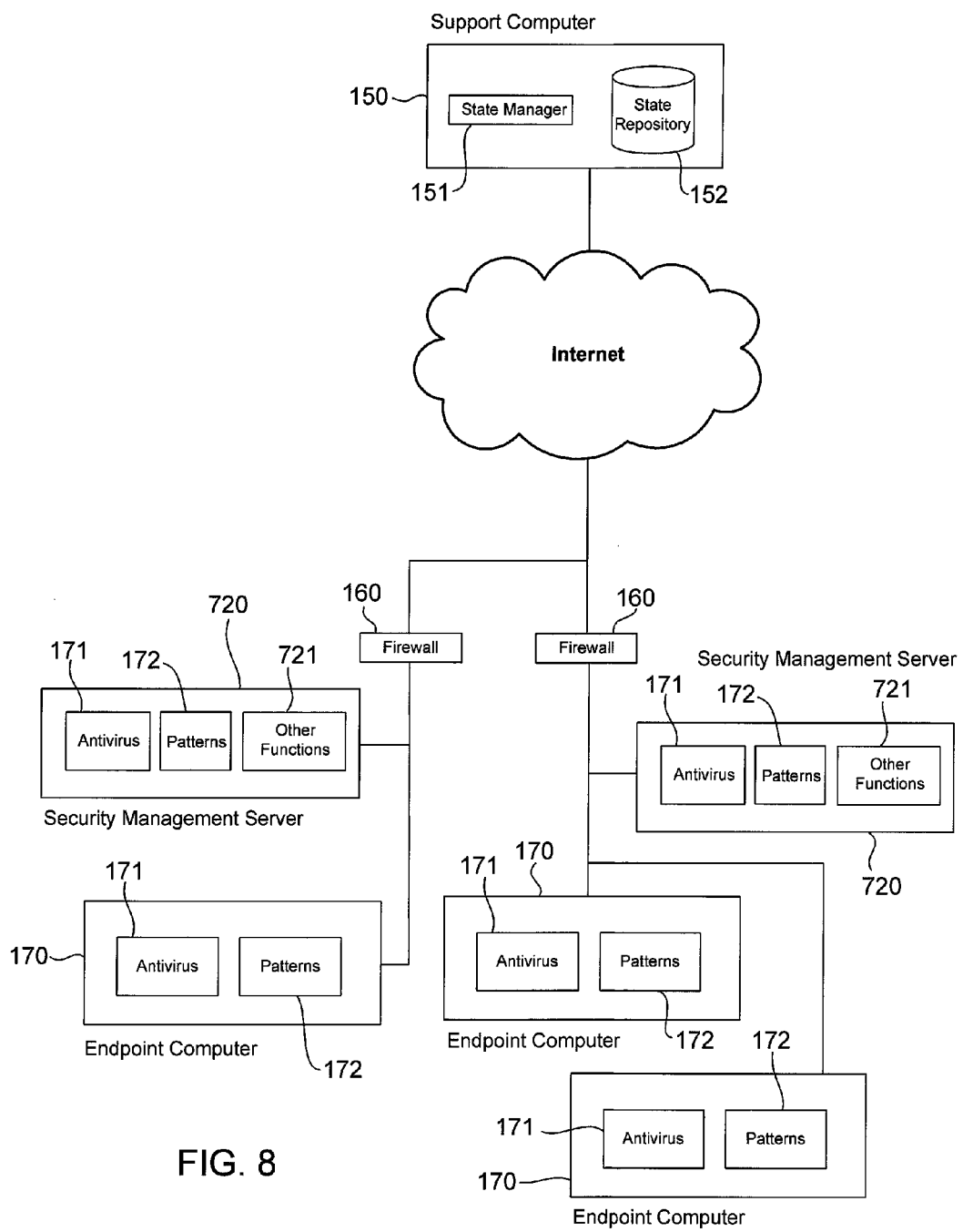
FIG. 8 schematically shows a computing environment in accordance with another embodiment of the present invention.

FIG. 8 schematically shows a computing environment in accordance with another embodiment of the present invention. In the example of FIG. 8, the computing environment includes a plurality of endpoint computers 170, one or more support computers 150, firewalls 160, and a plurality of security management servers 720. The computers of FIG. 8 may communicate over a computer network.

A security management server 720 may comprise a server computer for supporting computer security functionalities in a private computer network that includes endpoint computers 170. The endpoint computers 170 and the security management servers 720 may include an antivirus 171 and patterns 172. A security management server 720 may include other functions (labeled as 721), which may include pattern management and distribution. As in the computing environment of FIG. 6, computer security events in the endpoint computer 170 may be forwarded from the endpoint computer 170 to the support computer 150 as endpoint information by way of the security management server 720. The state manger 151 may record the security event in the state repository 152 under the GUiD of the endpoint computer 170. Any mitigation identified by the state manager 151 as being needed by the endpoint computer 170 may be provided directly from the support computer 150 to the endpoint computer 170. The mitigation may also be provided from the support computer 150 to the security management server 720, which then provides the mitigation to the endpoint computer 170.

Figure 9:
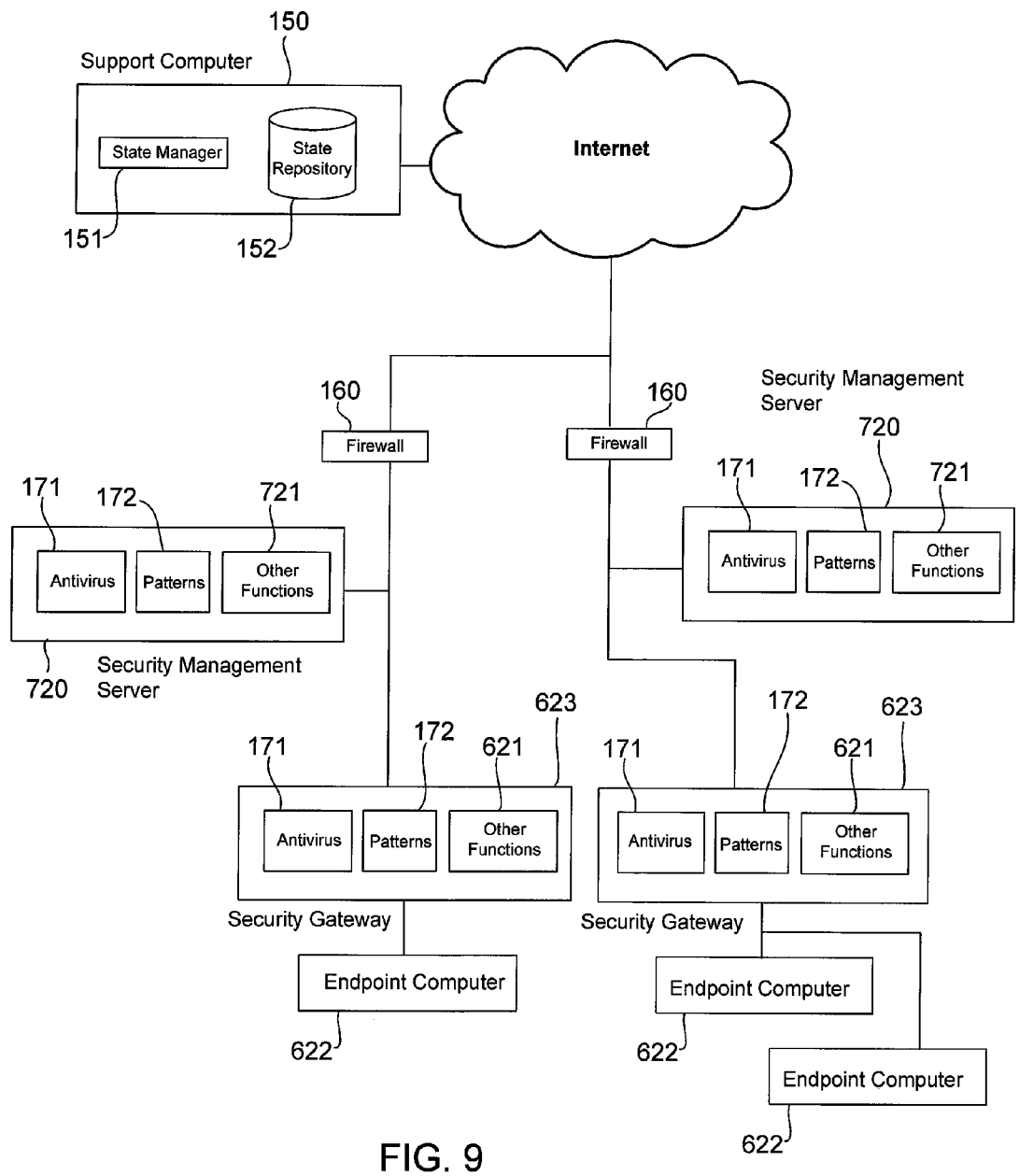
FIG. 9 schematically shows a computing environment in accordance with another embodiment of the present invention.

FIG. 9 schematically shows a computing environment in accordance with another embodiment of the present invention. The computing environment of FIG. 9 combines the features of the computing environments of FIGS. 6 and 8.

Methods and apparatus for providing mitigations to particular computers have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
sending a reputation query from a first computer to a second computer over a computer network, the reputation query comprising a network address of a website on the computer network;
providing the first computer a first reputation of the website at a first point in time, the first reputation indicating that the website is not a malicious website;
storing in a repository the network address and an identifier uniquely identifying the first computer, wherein the identifier comprises a combination of an IP address of the first computer and an IP address of a gateway computer supporting the first computer;
determining a second reputation of the website at a second point in time after the first point in time, the second reputation indicating that the website is a malicious website;
identifying the first computer as having navigated to the website when the website had the first reputation by consulting the repository; and
in response to identifying the first computer as having navigated to the website, providing mitigation to the first computer to address a malicious action that occurred on the first computer due to navigation of the first computer to the website before the second point in time.

2. The method of claim 1, wherein the computer network includes the Internet.

3. The method of claim 1, wherein the mitigation comprises a malicious code pattern and the malicious action comprises infecting the first computer with malicious code.

4. The method of claim 1, wherein the network address comprises a uniform resource locator (URL).

5. The method of claim 1, wherein the mitigation is provided only to computers identified as having navigated to the website.

6. A system comprising:
an endpoint computer that is configured to send a reputation query to a support server computer over a computer network, the reputation query comprising a network address of a website on the computer network; and
the support server computer configured to provide the endpoint computer a first reputation of the website at a first point in time indicating that the website is not a malicious website at the first point in time, determine a second reputation of the website at a second point in time after the first point in time indicating that the website is a malicious website, identify the endpoint computer as having navigated to the website when the website had the first reputation, and, in response to identifying the endpoint computer as having navigated to the website, provide mitigation to the endpoint computer, wherein the support server computer further configured to store in a repository the network address and an identifier uniquely identifying the endpoint computer and to consult the repository to identify the first computer as having navigated to the website, wherein the identifier comprises a combination of an IP address of the endpoint computer and an IP address of a gateway computer supporting the endpoint computer.

7. The system of claim 6, wherein the computer network includes the Internet.

8. The system of claim 6, wherein the mitigation comprises a malicious code pattern.

9. The system of claim 6, wherein the network address comprises a uniform resource locator (URL).

10. The system of claim 6, wherein the support server computer provides the mitigation only to computers identified as having navigated to the website.

* * * * *